United States Patent
Zevetchin et al.

(10) Patent No.: US 12,528,692 B2
(45) Date of Patent: *Jan. 20, 2026

(54) BOTTLE

(71) Applicant: Archoil, Inc., Oxford, CT (US)

(72) Inventors: David Colin Zevetchin, Oxford, CT (US); Christopher Buckman, Oxford, CT (US); Ralph Lynch, Oxford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/054,871

(22) Filed: Feb. 16, 2025

(65) Prior Publication Data

US 2025/0296829 A1    Sep. 25, 2025

Related U.S. Application Data

(63) Continuation-in-part of application No. 18/612,084, filed on Mar. 21, 2024, now Pat. No. 12,227,407.

(51) Int. Cl.
*B67D 7/30* (2010.01)
*B67D 7/04* (2010.01)

(52) U.S. Cl.
CPC .............. *B67D 7/301* (2013.01); *B67D 7/04* (2013.01)

(58) Field of Classification Search
CPC ............. B67D 7/301; B67D 7/30; B67D 7/04
See application file for complete search history.

(56) References Cited

U.S. PATENT DOCUMENTS

| | | | |
|---|---|---|---|
| 5,556,011 A * | 9/1996 | Jennings | B65D 83/06 222/455 |
| D379,063 S * | 5/1997 | Sill, Jr. | D9/543 |
| 6,290,102 B1 * | 9/2001 | Jennings | G01F 11/262 222/158 |
| D564,364 S * | 3/2008 | White | D9/741 |
| 9,051,073 B2 * | 6/2015 | Jennings | G01F 11/286 |
| D883,104 S * | 5/2020 | Castaing | D9/741 |
| 12,258,178 B1 * | 3/2025 | Tennar | B67D 7/301 |
| 2014/0252039 A1 * | 9/2014 | Jennings | B65D 25/56 222/158 |
| 2016/0031697 A1 * | 2/2016 | Zweifel | B67D 7/0288 141/1 |

* cited by examiner

*Primary Examiner* — Vishal Pancholi
(74) *Attorney, Agent, or Firm* — RC Trademark Company

(57) ABSTRACT

According to some embodiments, a bottle is disclosed. The bottle includes a main storage area, a dosage storage chamber, and a dispensing neck. The dosage storage chamber is coupled to the main storage area via a fluid channel. The dispensing neck extends from the dosage storage chamber for dispensing a content of the bottle. In a case that the dispensing neck is positioned parallel with the ground, the content of the bottle in the dosage storage chamber will not flow into the dispensing neck.

13 Claims, 8 Drawing Sheets

BOTTLE

BACKGROUND

Additives for fuels, such as gasoline or diesel, may be introduced into a fuel tank associated with a combustion engine (e.g., a motor vehicle engine) to enhance one or more characteristics of the fuel. For example, the additive may increase the fuel's octane rating, aid in inhibiting corrosion or act as a lubricant. These additives may provide for greater efficiency and power of the combustion engine. Many additives can be harmful to humans and thus the additives need to be added to the fuel tank in a safe and efficient manner to avoid spillage. Therefore, a bottle to include additives to a fuel tank safely and efficiently is desirable.

SUMMARY

Some embodiments described herein relate to a bottle that comprises a main storage area, a dosage storage chamber, and a dispensing neck. The dosage storage chamber may be coupled to the main storage area via a fluid channel. The dispensing neck extends from the dosage storage chamber for dispensing a content of the bottle. In a case that the dispensing neck may be positioned parallel with the ground, the content of the bottle in the dosage storage chamber may not flow into the dispensing neck.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments.

The present embodiments described herein relate to a novel bottle that may be used to dispense fuel additives into fuel tanks (e.g., gas tanks) associated with a combustion engine. Bottles used to store or hold fuel additives must be comprised of materials that do not break down and/or leak due to the fuel additives that they hold. Therefore, very specific plastic bottle formulations are used that can withstand the caustic nature of fuel additives.

Figure 1:
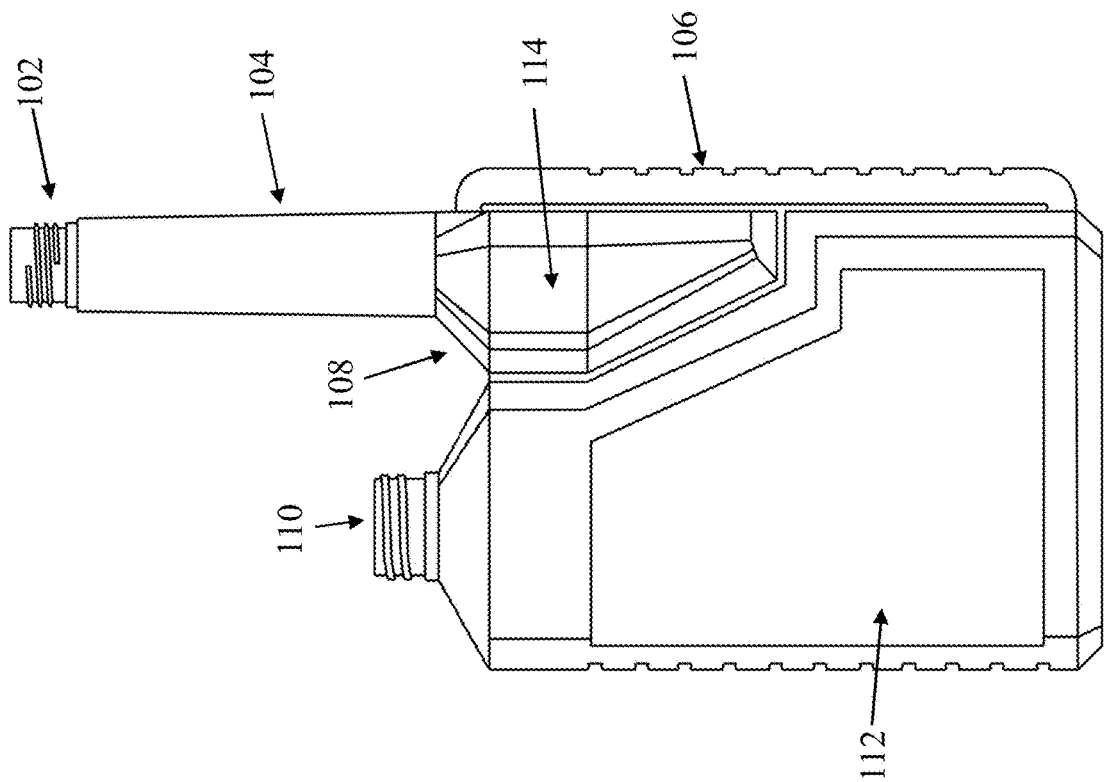
FIG. 1 illustrates a bottle in accordance with some embodiments.
Figure 2:
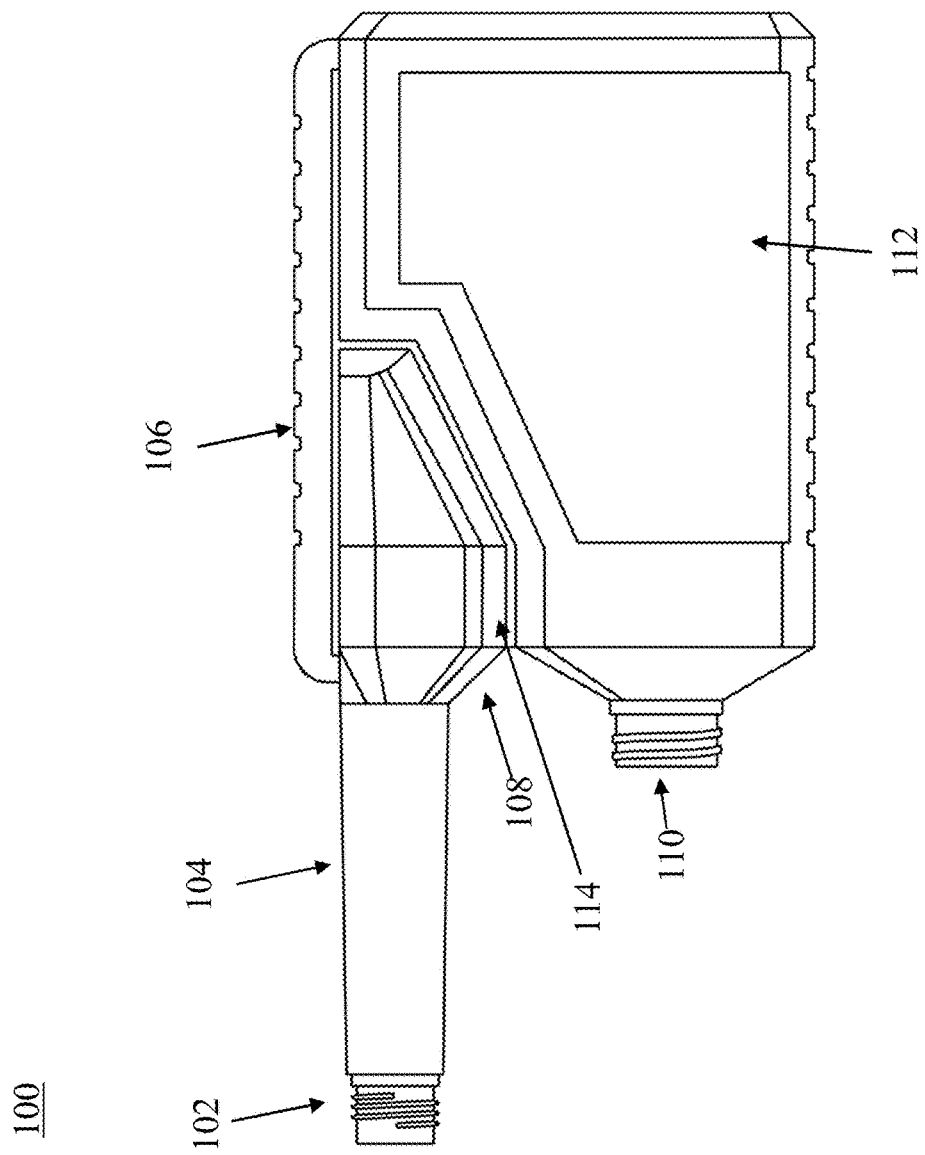
FIG. 2 illustrates a bottle in accordance with some embodiments.
Figure 3:
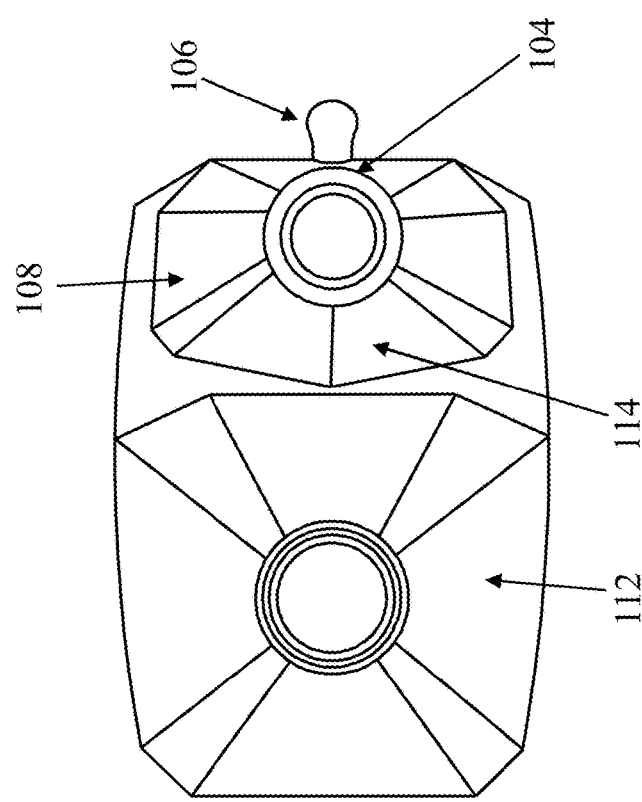
FIG. 3 illustrates a bottle in accordance with some embodiments.
Figure 4:
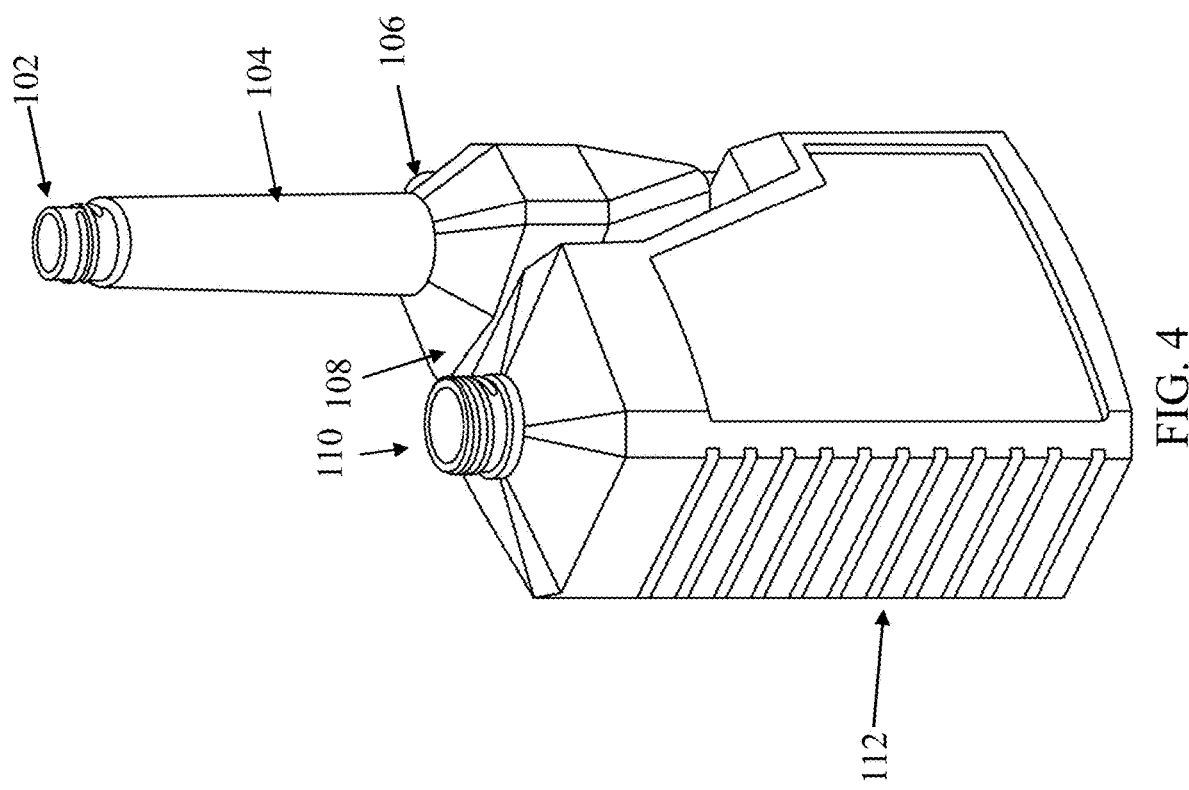
FIG. 4 illustrates a bottle in accordance with some embodiments.
Figure 5:
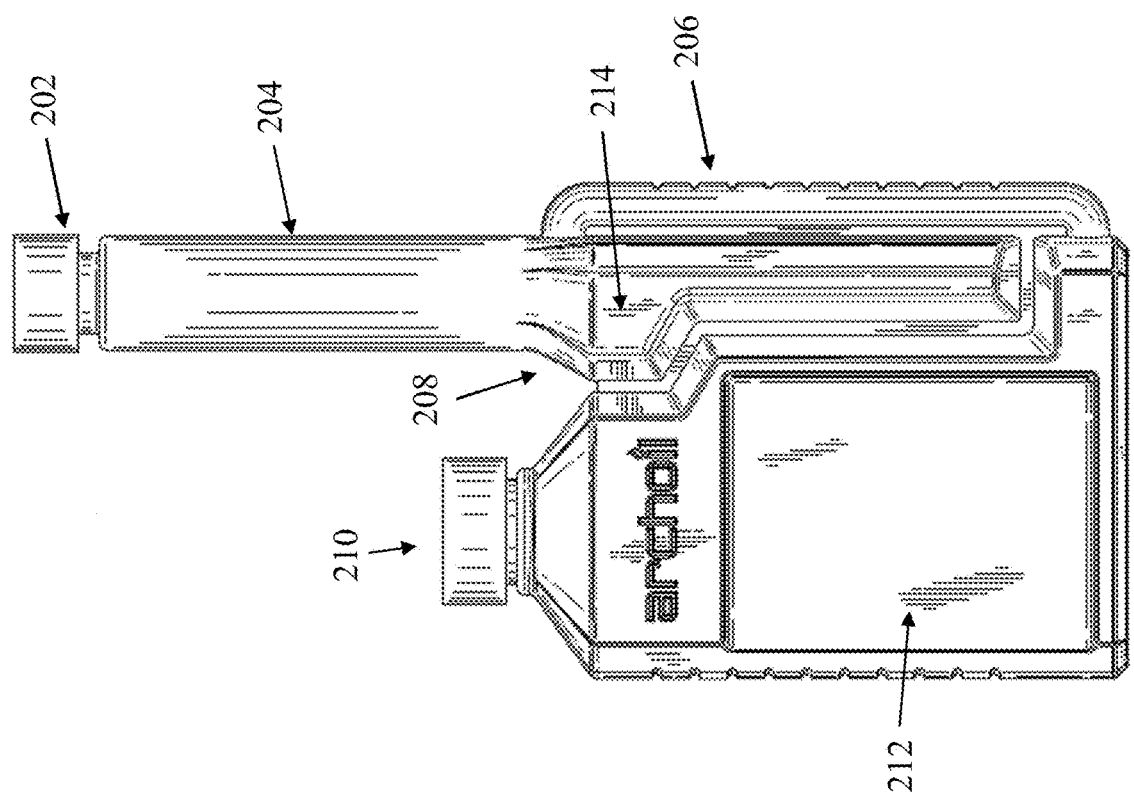
FIG. 5 illustrates a bottle in accordance with some embodiments.
Figure 6:
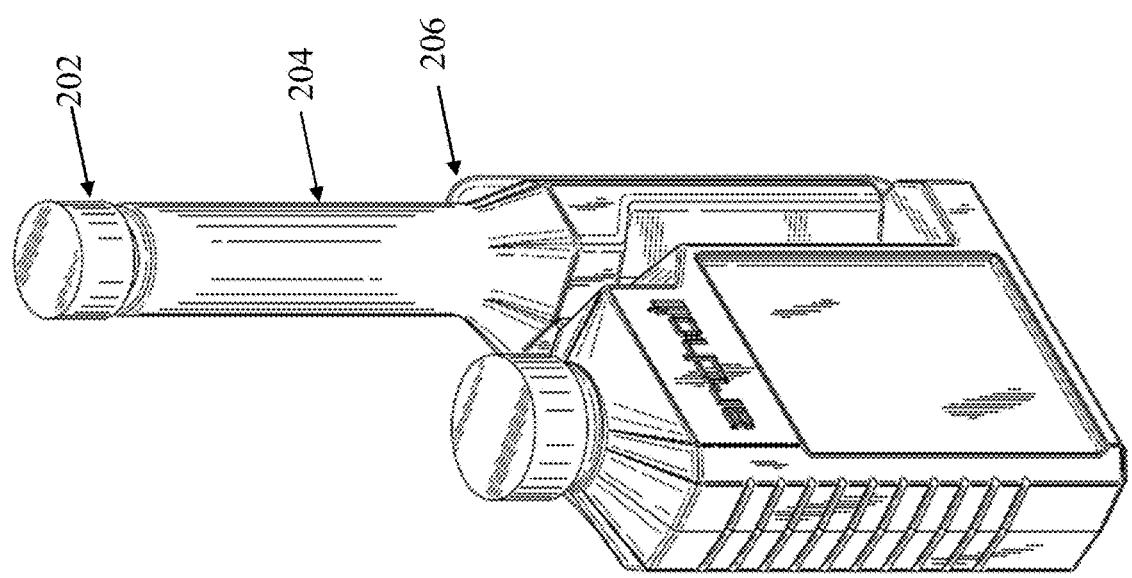
FIG. 6 illustrates a bottle in accordance with some embodiments.
Figure 7:
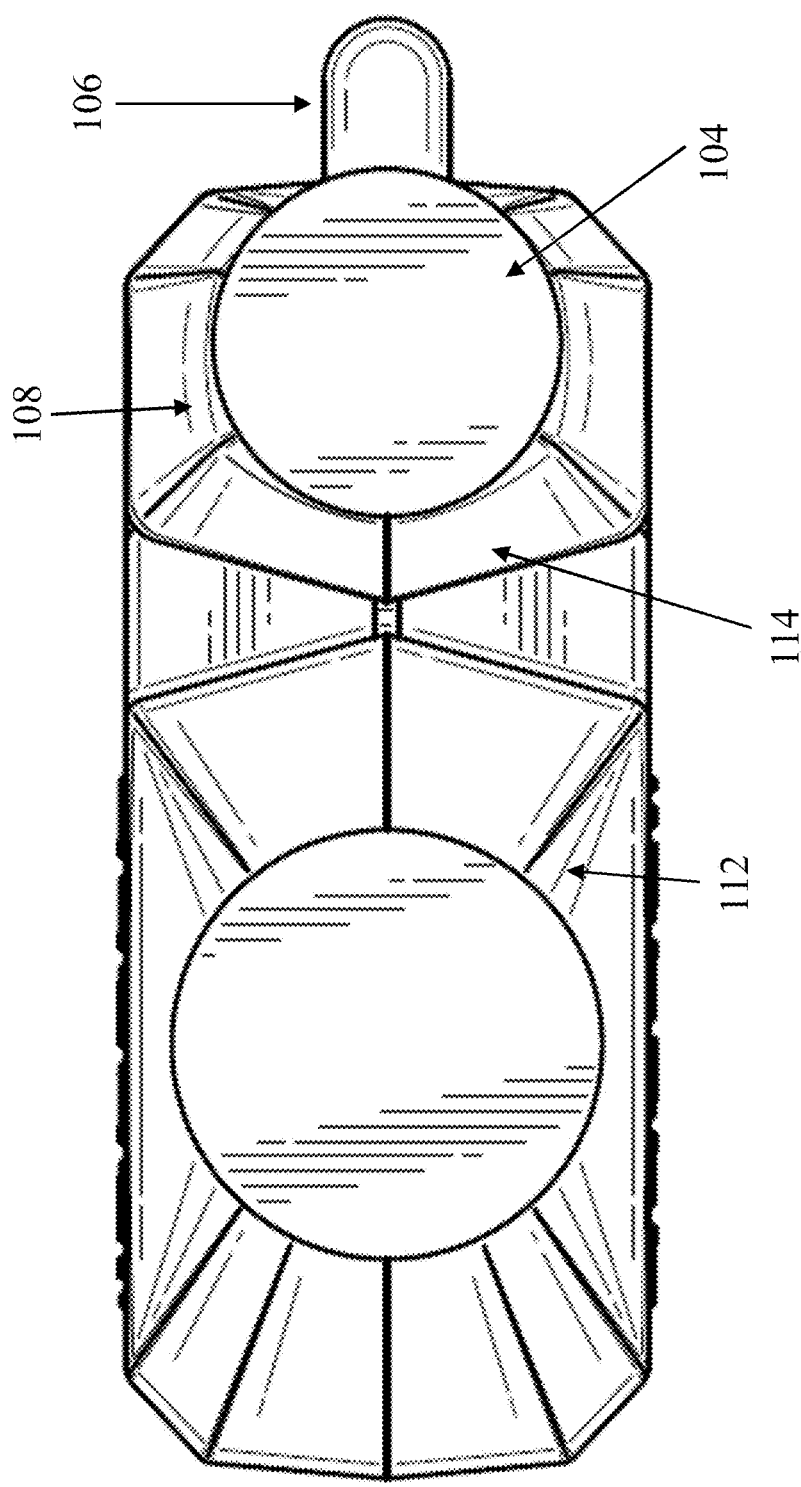
FIG. 7 illustrates a bottle in accordance with some embodiments.
Figure 8:
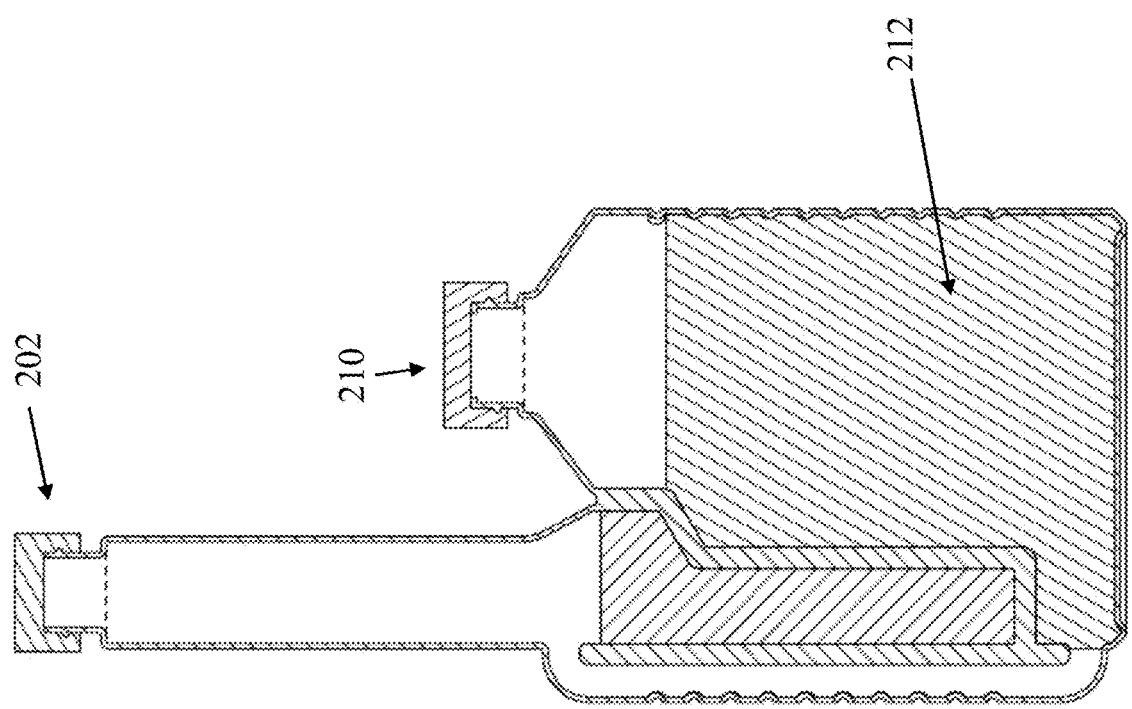
FIG. 8 illustrates a bottle in accordance with some embodiments.

Now referring to FIG. 1, FIG. 2 and FIG. 3, an embodiment of a bottle 100 is illustrated. As illustrated in FIG. 1, the bottle 100 comprises a main storage area 112 that may be accessible via opening 110. A dosage storage chamber 108 may be coupled to the main storage area 112 via a fluid channel 106. The dosage storage chamber 108 defines a reservoir 114 within the dosage storage chamber 108 where the reservoir 114 may be wider than an opening to a dispensing neck 104.

The dispensing neck 104 extends from a central portion of the dosage storage chamber 108 for dispensing the contents of the bottle (e.g., fuel additives). As such, the reservoir 114 surrounds an opening from the storage chamber 108 to the dispensing neck 104. In one embodiment, and as illustrated in FIG. 2, when the dispensing neck 104 may be positioned parallel with the ground, the contents of the bottle in the dosage storage chamber 108 may not flow into the dispensing neck 104 since the contents may reside in the reservoir 114.

In some embodiments, and as illustrated in FIG. 3, in a case that the dispensing neck 104 may be positioned parallel with the ground and then rotated so it is positioned parallel with the ground in an opposite direction, the content of the bottle in the dosage storage chamber 108 may not flow into the dispensing neck since the contents may still reside in the reservoir 114 which surrounds the dispensing neck on three sides. In some embodiments, the reservoir 114 may surrounds the dispensing neck on four sides. The dispensing neck 104 may comprise an opening 102 for pouring the contents from the dosage storage chamber 108 to a fuel tank (not shown).

The fluid channel 106 may be affixed to (i) a bottom of the main storage area 112 and (ii) a top of the dosage storage chamber 108. This configuration may allow for fluid from the main storage area 112 to be moved into the dosage storage chamber 108 by squeezing the main storage area 112 which pushes fluid into the dosage storage chamber 108. The fluid channel 106 may be curved at the point where it connects to (i) the bottom of the main storage area 112 and (ii) the top of the dosage storage chamber 108. The curved sections may reduce backflow and prevent more fluid to go into the dosage storage chamber 108 thus providing more precise dosing than conventional bottles.

For purposes of illustrating features of the present embodiments, an example will now be introduced. Those skilled in the art will recognize that this example is illustrative and is not limiting and is provided purely for explanatory purposes. In use, a consumer would squeeze the main storage area 112 thus forcing fluid to travel through the fluid channel 106 and into the dosage storage chamber 108. Once the dosage storage chamber 108 contains a correct dosage of fuel additive as determined by the consumer, the consumer would point the dispensing neck 104 toward an opening in a vehicle's fuel tank. The additive in the dosage store area would move, based on gravity, into the reservoir 114. The neck 104 would then be inserted into the fuel tank and tilted such that the fuel additives leave the reservoir 114 within the dosage storage chamber 108 and flow through an opening to the neck 104, through the neck 104, and into the fuel tank.

In some embodiments, a top portion 110 of the main storage area 112 may be threaded and a top portion 102 of the dispensing neck 104 may be threaded. The threaded top portions facilitate covering the bottle for storage of its contents. In order to facilitate ease of the dispensing neck 104 entering an opening to a fuel tank, the dispensing neck 104 may extend beyond a height of the main storage area 112. In some embodiments, the dispensing neck 104 may extend past the main storage area 112 by a minimum of 4" so that the contents contained in the dosage storage chamber 108 may be poured into any fill neck associated with a fuel tank without spilling. The dispensing neck 104 may be configured so that when the fuel additive is poured out, the dispensing neck 104 does not bend and this further (i) reduces backflow into the dosage storage chamber 108 and (ii) prevents more fluid to go into the dosage storage chamber 108 thus providing more precise dosing than conventional bottles. The dispensing neck 104 may be configured in size to enter a fuel storage neck that leads to a fuel tank. In some embodiments, the dispensing neck 104 may be configured in size to enter a capless fuel storage neck as used in many motor vehicles. In some embodiments, an action of pouring the contents out of the bottle's dosage storage chamber 108 can be performed with the bottle rotating 360 degrees. An action to fill the dosing storage chamber 108 may be done by squeezing the bottle 100 at the main storage area 112 to fill the dosing storage chamber from the main storage area 112. The dosage storage chamber 108 may be marked in increments of 15 ml/0.25 oz so that the contents can be measured in 15 ml/0.25 oz increments. In some embodiments, a width of the bottle 100 may not exceed a width of 4" to allow the bottle 100 to be held by the average size hand. The width of the bottle 100 may comprise a width of the main storage area 112 and the fluid channel 106 as measured from a bottom of the bottle 100. The dosage storage chamber 108 may not exceed a height of the main storage area 112 to keep the bottle 100 in a most compact size.

Now referring to FIG. 5, FIG. 6, FIG. 7 and FIG. 8, an embodiment of a bottle 200 is illustrated. As illustrated in FIG. 5, FIG. 6, FIG. 7 and FIG. 8, the bottle 200 comprises a main storage area 212 that may be accessible via opening 210. A dosage storage chamber 208 may be coupled to the main storage area 212 via a fluid channel 206. The dosage storage chamber 208 defines a reservoir 214 within the dosage storage chamber 208 where the reservoir 214 may be wider than an opening to a dispensing neck 104.

The dispensing neck 204 extends from a central portion of the dosage storage chamber 208 for dispensing the contents of the bottle (e.g., fuel additives). As such, the reservoir 214 surrounds an opening from the storage chamber 208 to the dispensing neck 204.

In some embodiments, the reservoir 214 surrounds the dispensing neck on three sides. In some embodiments, the reservoir 214 may surround the dispensing neck on four sides. The dispensing neck 204 may comprise an opening 202 for pouring the contents from the dosage storage chamber 208 to a fuel tank (not shown).

The fluid channel 206 may be affixed to (i) a bottom of the main storage area 212 and (ii) a top of the dosage storage chamber 208. This configuration may allow for fluid from the main storage area 212 to be moved into the dosage storage chamber 208 by squeezing the main storage area 212 which pushes fluid into the dosage storage chamber 208. The fluid channel 206 may be curved at the point where it connects to (i) the bottom of the main storage area 212 and (ii) the top of the dosage storage chamber 208. The curved sections may reduce backflow and prevent more fluid to go into the dosage storage chamber 208 thus providing more precise dosing than conventional bottles.

For purposes of illustrating features of the present embodiments, an example will now be introduced. Those skilled in the art will recognize that this example is illustrative and is not limiting and is provided purely for explanatory purposes. In use, a consumer would squeeze the main storage area 212 thus forcing fluid to travel through the fluid channel 206 and into the dosage storage chamber 208. Once the dosage storage chamber 208 contains a correct dosage of fuel additive as determined by the consumer, the consumer would point the dispensing neck 204 toward an opening in a vehicle's fuel tank. The additive in the dosage store area would move, based on gravity, into the reservoir 214. The neck 204 would then be inserted into the fuel tank and tilted such that the fuel additives leave the reservoir 214 within the dosage storage chamber 208 and flow through an opening to the neck 204, through the neck 204, and into the fuel tank.

In some embodiments, a top portion 210 of the main storage area 212 may be threaded and a top portion 202 of the dispensing neck 204 may be threaded. The threaded top portions facilitate covering the bottle for storage of its contents. In order to facilitate ease of the dispensing neck 204 entering an opening to a fuel tank, the dispensing neck 204 may extend beyond a height of the main storage area 212. In some embodiments, the dispensing neck 204 may extend past the main storage area 212 by a minimum of 4" so that the contents contained in the dosage storage chamber 208 may be poured into any fill neck associated with a fuel tank without spilling. The dispensing neck 204 may be configured so that when the fuel additive is poured out, the dispensing neck 204 does not bend and this further (i) reduces backflow into the dosage storage chamber 208 and (ii) prevents more fluid to go into the dosage storage chamber 108 thus providing more precise dosing than conventional bottles. The dispensing neck 204 may be configured in size to enter a fuel storage neck that leads to a fuel tank. In some embodiments, the dispensing neck 204 may be configured in size to enter a capless fuel storage neck as used in many motor vehicles. In some embodiments, an action of pouring the contents out of the bottle's dosage storage chamber 208 can be performed with the bottle rotating 360 degrees. An action to fill the dosing storage chamber 208 may be done by squeezing the bottle 200 at the main storage area 212 to fill the dosing storage chamber from the main storage area 212. The dosage storage chamber 208 may be marked in increments of 15 ml/0.25 oz so that the contents can be measured in 15 ml/0.25 oz increments. In some embodiments, a width of the bottle 200 may not exceed a width of 4" to allow the bottle 200 to be held by the average size hand. The width of the bottle 200 may comprise a width of the main storage area 212 and the fluid channel 206 as measured from a bottom of the bottle 200. The dosage storage chamber 208 may not exceed a height of the main storage area 212 to keep the bottle 100 in a most compact size.

In some embodiments, the dosage storage chamber is coupled to the main storage area via a fluid channel, wherein a top surface of the dosage storage chamber comprises seven planar portions each coupled to a center opening and a side portion of the dosage chamber. In some embodiments, the dispensing neck 204 extends from the dosage storage chamber for dispensing a content of the bottle. In some embodiments, the dispensing neck is at least three times longer than a threaded top portion of the main storage area for entering a capless fuel storage neck. In some embodiments, the fluid channel comprises a first portion perpendicular with the dosage storage chamber, a second portion parallel with an opposite side of the main storage area and a third portion perpendicular with the main storage area, wherein the first portion and the third portion are affixed to opposite ends of the second portion, and wherein the second portion comprises a plurality of grooves for gripping the bottle. In some embodiments, each of the seven planar portions of the top position is coupled to a corresponding planar portion of the side portion. In some embodiments, the side portion comprises two side first planar portions of a first size, two side second planar portions of a second size, two side third planar portions of a third size and one fourth planar portion of a fourth size, wherein the first size, the second size, the third size and the fourth size are different sizes.

This written description uses examples to disclose multiple embodiments, including the preferred embodiments, and to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A bottle, the bottle comprising:
    a main storage area comprising a flared spout portion, wherein the flared spout portion begins at a first height from a bottom surface of the bottle;
    a dosage storage chamber coupled to the main storage area via a fluid channel, wherein a top surface of the dosage storage chamber comprises seven planar portions each directly coupled to a center opening and a side portion of the dosage chamber wherein each of the seven planar portions of the top position is coupled to a corresponding planar portion of the side portion at a second height from the bottom surface of the bottle, and wherein the first height is the same as the second height; and
    a dispensing neck extending from the dosage storage chamber for dispensing a content of the bottle, wherein the dispensing neck is at least three times longer than a threaded top portion of the main storage area for entering a capless fuel storage neck, wherein the fluid channel comprises a first portion perpendicular with the dosage storage chamber, a second portion parallel with an opposite side of the main storage area and a third portion perpendicular with the main storage area, wherein the first portion and the third portion are affixed to opposite ends of the second portion, and wherein the second portion comprises a plurality of grooves for gripping the bottle.

2. The bottle of claim 1, wherein the content of the bottle is a fuel additive for combustion engines.

3. The bottle of claim 1, wherein a top portion of the main storage area is threaded and a top portion of the dispensing neck is threaded.

4. The bottle of claim 1, wherein the dispensing neck extends beyond a height of the main storage area.

5. The bottle of claim 1, wherein the fluid channel is (i) coupled to a bottom portion of the main storage area and (ii) coupled to a top portion of the dosage storage chamber.

6. The bottle of claim 1, wherein an action of pouring out of the bottle's fill area can be performed with the bottle rotating 360 degrees.

7. The bottle of claim 1, wherein filling the dosage storage chamber is performed by squeezing the main storage area until the dosage storage chamber contains a desired amount of contents.

8. The bottle of claim 1, where in the dosage storage chamber is incremented in amounts of 15 ml/0.25 oz.

9. The bottle of claim 1, wherein the dispensing neck extends past the main storage area by a minimum of 4".

10. The bottle of claim 1, wherein a width of the bottle does not exceed 4".

11. The bottle of claim 1, wherein in the dosage storage chamber does not exceed the height of the main storage area.

12. The bottle of claim 1, wherein each of the seven planar portions of the top position is coupled to a corresponding planar portion of the side portion.

13. The bottle of claim 12, wherein the side portion comprises two side first planar portions of a first size, two side second planar portions of a second size, two side third planar portions of a third size and one fourth planar portion of a fourth size, wherein the first size, the second size, the third size and the fourth size are different sizes.

* * * * *